Nov. 3, 1931.  J. G. EVERSTAM  1,830,055

SHOCK ABSORBER

Filed March 24, 1928

Inventor:
Johan Gunnar Everstam
by George Bayard Jones
Attorney.

Patented Nov. 3, 1931

1,830,055

UNITED STATES PATENT OFFICE

JOHAN GUNNAR EVERSTAM, OF SUNDSVALL, SWEDEN, ASSIGNOR TO AKTIEBOLAGET SVENSKA STOTDAMPAREFABRIKEN, OF STOCKHOLM, SWEDEN, A MANUFACTURING COMPANY OF SWEDEN

SHOCK ABSORBER

Application filed March 24, 1928, Serial No. 264,487, and in Sweden March 30, 1927.

The present invention relates to a shock absorber or stabilator of the type which is often used on automobiles and other vehicles in order to moderate and check the tossing of the car body when the wheels pass over bumps and other inequalities in the surface of the roadbed, and which comprise a brake provided in a cover, and a strap, cord, or the like, the pulling out of which from the cover is braked or resisted by said brake, and which, upon the pull in the end of the cord extending outside the cover casing, is again drawn into the cover by a spring. The cover is usually fastened to the car frame, and the outer end of the strap or cord is fastened to the wheel axle, so that the shock absorber only performs its checking action when the load on the car springs is relieved, that is to say, when the car frame moves away from the wheel axle. Shock absorbers of this type as heretofore used, have the disadvantage that they must be made of comparatively large size in order to become sufficiently effective, and therefore, it becomes difficult on the modern low automobiles where the available space below the car body is limited, to install sufficiently effective shock absorbers of the construction hitherto used. Said old shock absorbers also suffer from the disadvantage that the heat generated during the frequent functioning of the brake, can not be dissipated in an efficient manner, and for this reason the brake might easily become overheated and damaged, so that it begins to squeak.

The present invention has for its purpose to avoid these disadvantages. The invention consists principally in that the brake consists of a strong coil spring which is wound around a stationary brake drum, and one end of which is connected to a member connected to the cord, and the other end of which, or a member attached to said end, is, by the tension of the spring, held pressed against a stationary portion of the casing, so that upon the cord being pulled out of the casing, the coil spring is tightened around the brake drum and thereby effects the braking action. By this arrangement a rapidly and securely working brake device is obtained, consisting of parts which are very little sensitive to heat, and which may also be allowed to work in oil through which the heat generated is conducted to the outer casing, which in its turn is cooled by the outside air which sweeps over the same when the car is in motion.

Figure 1:
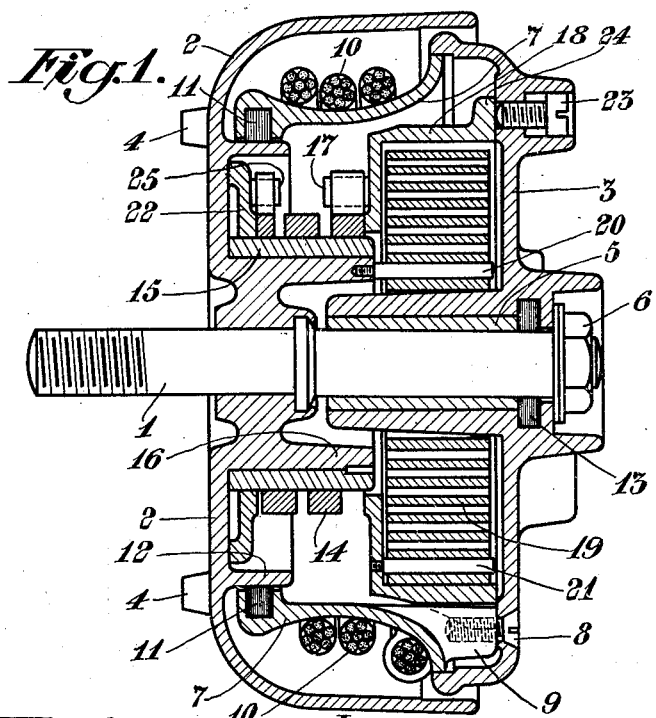
Figure 2:
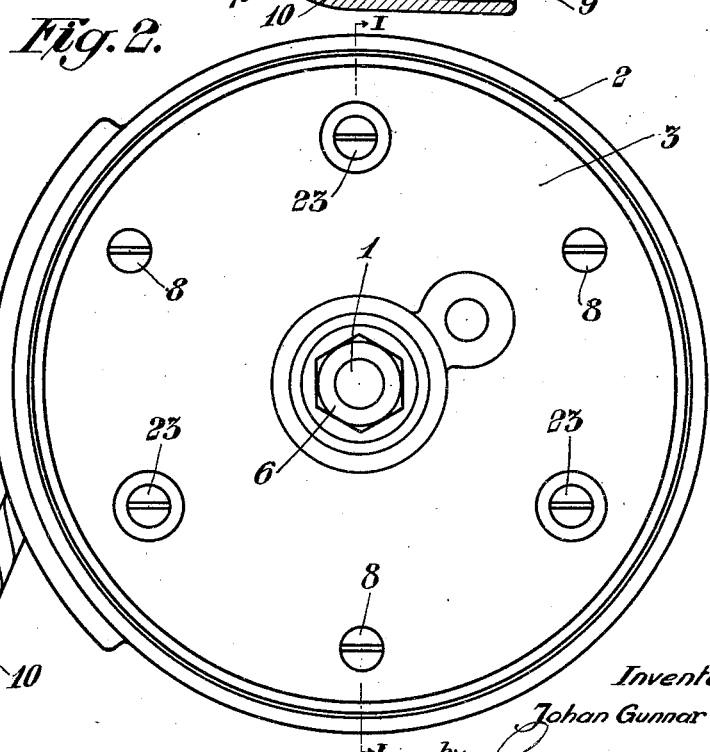

In the accompanying drawings an embodiment of the invention is illustrated by way of example. Fig. 1 shows a shock absorber or stabilator according to the invention in axial section on the line I—I in Fig. 2, and Fig. 2 shows the shock absorber in side view.

Referring to the drawings, 1 denotes a heavy screw bolt which serves to fasten the shock absorber to the car frame, which latter is not shown in the drawings. The outer cover of the shock absorber consists of a casing 2 and a cover 3, the former of which is provided with two lugs 4 which are adapted to catch around the car frame so that in this manner the casing 2 is prevented from rotation relatively to the car frame. The cover 3 is rotatably journalled on the bolt 1 by means of a bushing 5, and is retained by a nut 6. The rotatable cover 3 is rigidly attached to a cord pulley or drum 7 located inside the casing 2, by means of three screws 8 which are screw-threaded into three bosses or lugs 9 on the cord drum. On the cord drum 7 a cord 10, for instance of steel wire, is placed, said cord being wound a few turns around the drum, and being secured at one end to the drum, the other end of the cord extending through an opening in the stationary casing 2 and being fastened in the usual way to the wheel axle of the car, i. e. to the front or rear axle depending upon where the shock absorber is placed. The cord drum 7 is provided with a packing ring 11 which cooperates with a flange 12 on the inside of the stationary casing 2, and the rotatable cover 3 is provided with a similar packing ring 13 which cooperates with the bolt 1. By this arrangement the closed space formed by the members 2, 3 and 7 may be kept filled with oil.

The brake which serves to brake or check the pulling out of the cord from the casing 2, consists, according to the invention, of a strong coil spring 14 which is wound around a brake drum 15 which is secured in suitable manner to a flange 16 on the inside of the stationary casing 2. One end of the brake spring 14 is attached to a pin 17 on a housing 18 which is guided by the lugs 9 in such manner that it is slightly movable in the axial direction, but is prevented from rotation relatively to the cord drum 7, so that it is thus always entrained upon said drum rotating. The housing 18 encloses a weaker coil spring 19, one end of which is attached to a pin 20 secured to the stationary flange 16, and the other end of which is attached to a pin 21 secured to the housing 18, in such manner that said spring 19 tends to turn the housing 18 and thus also the cord drum 7. This spring 19 serves to retract the cord 10 within the casing 2 after the cord has been pulled out owing to the movements of the car frame relatively to the wheel axle. The other end of the brake spring 14 is attached to a pin 25 on a friction ring 22 which is rotatably mounted on the brake drum 15, and which is held bearing against the inside of the stationary casing 2 by the tension of the spring 14. The axially movable spring housing 18 is under the influence of three adjustment screws 23 which are screw-threaded into the rotatable cover 3, and the inner ends of which bear against projections 24 on the spring housing 18. By means of these adjustment screws 23 the tension of the brake spring 14 in the axial direction, and thus also the pressure with which the friction ring 22 bears against the inner surface of the casing 2, may be increased or decreased as required. As shown in Fig. 1, the brake spring 14 is made with a rectangular cross section, so that it obtains a comparatively large bearing surface against the brake drum 15, which latter as well as the brake spring should preferably be made of hardened steel.

When installing the shock absorber on the car, the cord 10 is pulled out of the cover 2 so far, and attached to the wheel axle in such manner that the spring 19 becomes slightly tensioned, whereas the brake spring 14 lies loose around the brake drum 15. When during the movement of the car one of its wheels passes over a bump in the road, the car spring at said wheel becomes compressed, with the result that the pull in the cord 10 of the corresponding shock absorber ceases, so that the comparatively weak spring 19 can rotate the housing 18 and the cord drum 7 and retract the cord 10 so far into the casing that the cord again becomes taut. Upon the spring housing 18 thus rotating, the brake spring 14 and the friction ring 22 are also entrained, without the former clutching around or taking hold of the brake drum 15. When the car spring again tends to resume its normal or balanced position a pull is set up in the cord 10, and owing to the resistance to rotation exerted by the friction ring 22, the brake spring 14 immediately clutches tightly around the brake drum 15 thereby braking the pulling out of the cord 10 from the casing. In this manner the shock absorber performs the desired moderating or checking action when the car body moves away from the wheel axle, whereas the brake is practically inactive when the spring 19 retracts the cord 10 within the casing. Since, as above explained, the brake may be allowed to work in oil, overheating of the brake is prevented, as is also squeaking during the operation of the shock absorber.

The embodiment above described and illustrated in the drawings is only to be regarded as an example, and it will be understood that the same is capable of modification as regards its details in several ways without departing from the principle and scope of the invention.

I claim:

1. A shock absorber, comprising a casing, a cord, a winding spring in said casing operatively connected to said cord and adapted to wind said cord into said casing, a brake drum attached to said casing, and a brake member consisting of a coil spring surrounding said brake drum, one end of said brake spring being operatively connected to said winding spring, and the other end of said brake spring effecting frictional engagement with said casing.

2. A shock absorber, comprising a casing, a cord drum rotatable in said casing, a cord attached to said cord drum, a winding spring in said casing adapted to rotate said cord drum so as to wind said cord on said drum, a brake drum attached to said casing, and a brake member consisting of a coil spring surrounding said brake drum, one end of said brake spring being attached to said cord drum, and the other end of said brake spring effecting frictional engagement with said casing.

3. A shock absorber, comprising a casing, a cord drum rotatable in said casing, a cord attached to said cord drum, a spring housing attached to said cord drum, a winding spring inside said spring housing adapted to rotate said spring housing and thereby said cord drum so as to wind said cord on said drum, a brake drum attached to said casing, a brake member consisting of a coil spring surrounding said brake drum, one end of said brake spring being attached to said spring housing, and a friction ring bearing against said casing, the other end of said brake spring being attached to said friction ring and holding said ring in frictional engagement with said casing by the tension of said brake spring.

4. A shock absorber, comprising a casing, a cord drum rotatable in said casing, a cord attached to said cord drum, a spring housing attached to said cord drum so as to be capable of axial movement relatively to the same, adjustment screws between said cord drum and said spring housing, a winding spring inside said spring housing adapted to rotate said spring housing and thereby said cord drum so as to wind said cord on said drum, a brake drum attached to said casing, a brake member consisting of a coil spring surrounding said brake drum, one end of said brake spring being attached to said spring housing, and a friction ring bearing against said casing, the other end of said brake spring being attached to said friction ring and holding said ring in frictional engagement with said casing by the tension of said brake spring.

JOHAN GUNNAR EVERSTAM.